United States Patent [19]
Arnaudeau

[11] Patent Number: 4,533,474
[45] Date of Patent: Aug. 6, 1985

[54] METHOD FOR SEPARATING IMMISCIBLE FLUIDS OF DIFFERENT SPECIFIC GRAVITIES

[75] Inventor: Marcel Arnaudeau, Paris, France

[73] Assignee: Institut Francais du Petrole, Rueil-Malmaison, France

[21] Appl. No.: 663,514

[22] Filed: Oct. 22, 1984

Related U.S. Application Data

[63] Continuation of Ser. No. 429,576, Sep. 30, 1982, Pat. No. 4,478,712.

[30] Foreign Application Priority Data

Sep. 30, 1981 [FR] France .............................. 81 18580

[51] Int. Cl.³ ............................................ B01D 45/14
[52] U.S. Cl. ..................................... 210/787; 210/805; 55/406; 166/105.5;
[58] Field of Search ....................... 209/211; 210/787, 96.1, 109, 112, 115, 194, 195.1, 512.3, 800–806, 808

[56] References Cited

U.S. PATENT DOCUMENTS

| | | | |
|---|---|---|---|
| 3,517,821 | 6/1970 | Monson et al. | 210/512.1 |
| 3,746,173 | 7/1973 | Daniel | 210/512.1 |
| 3,771,654 | 11/1973 | Meissner | 210/787 |
| 4,088,459 | 5/1978 | Tuzson | 166/105.5 |
| 4,361,490 | 11/1982 | Saget | 210/512.3 |
| 4,370,236 | 1/1983 | Ferguson | 210/805 |

*Primary Examiner*—Ivars Cintins
*Attorney, Agent, or Firm*—Millen & White

[57] ABSTRACT

A tubular centrifugal separator for immiscible fluids of different specific gravities comprises a tubular body provided with at least one concentric internal partition and fed at one end with the mixture of fluids to be separated. Included are also, at least two separate means for driving the fluid in rotation, the second of which is placed downstream from the end of an internal partition inside the tubular body. Extraction ducts are provided to withdraw the separated fluids and means to feed back remaining fractions of the mixture.

6 Claims, 6 Drawing Figures

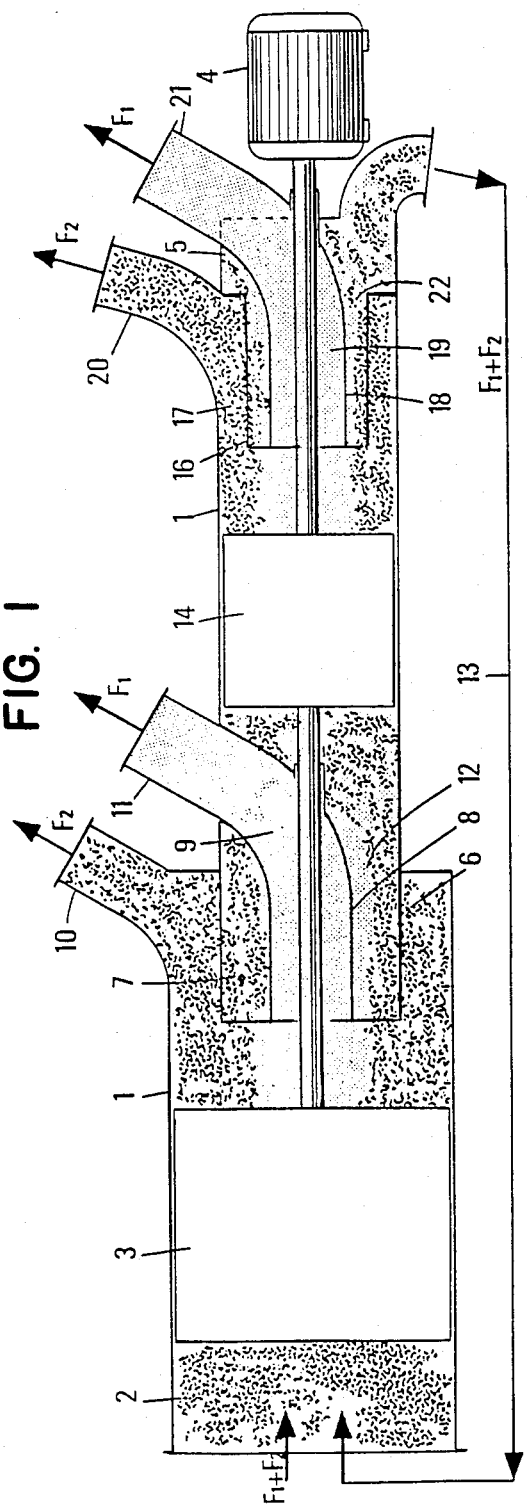
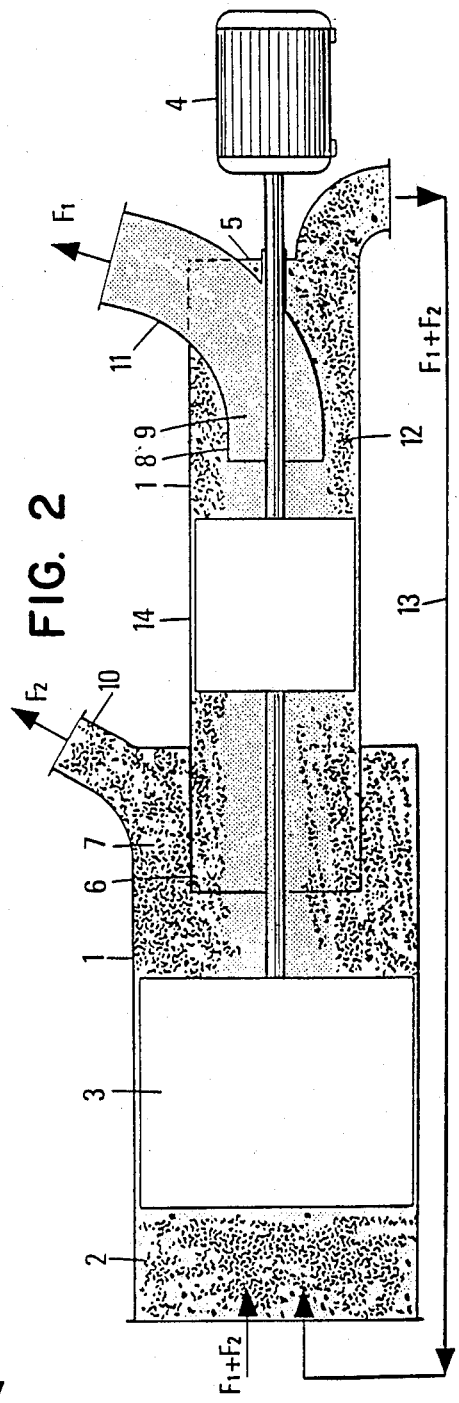
FIG. 1
FIG. 2

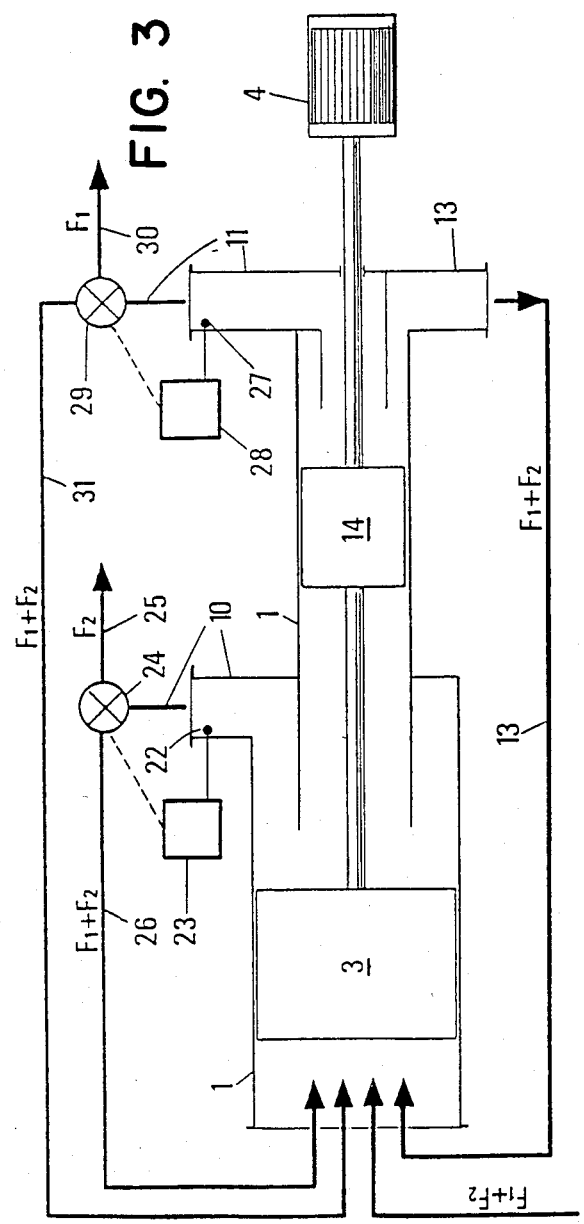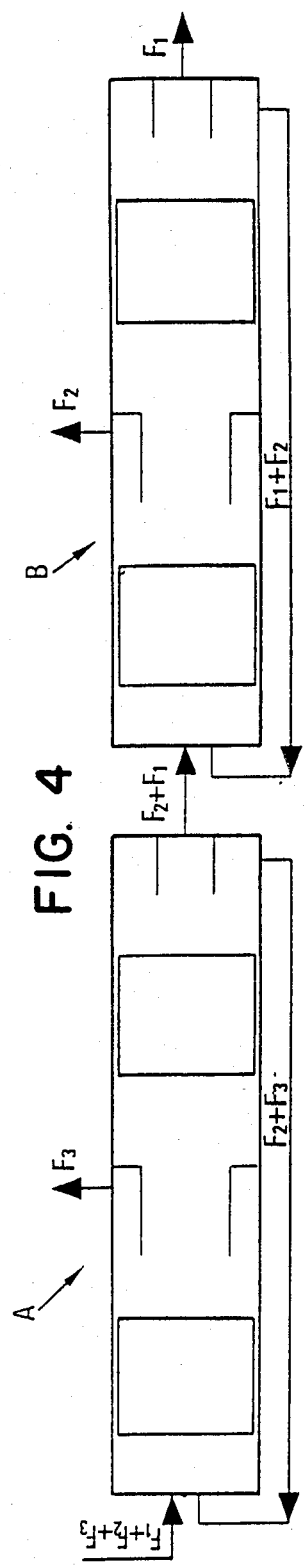

METHOD FOR SEPARATING IMMISCIBLE FLUIDS OF DIFFERENT SPECIFIC GRAVITIES

This is a continuation of application Ser. No. 429,576 filed Sept. 30, 1982, now U.S. Pat. No. 4,478,712.

BACKGROUND OF THE INVENTION

The present invention concerns a device for separating immiscible fluids of different specific gravities.

Centrifugal separators are known which are capable of subjecting a stream formed of a mixture of immiscible fluids of different specific gravities to the action of centrifugal forces. The fluid of low specific gravity is essentially collected in the central portion of the final stream, whereas the fluid of higher specific gravity is driven off at the periphery. An annular partition makes it possible to physically separate the two fluids. Such separators are described in the German Pat. No. 1,186,412 the U.S. Pat. No. 3,746,173 and the Swiss Pat. No. 536,126.

In practice, it is not possible to define the precise boundary or limit between the fluids of the final stream, this limit varies, moreover, according to modifications in the relative amounts of the fluids at the inlet of the separator.

However, for certain applications, it is necessary to achieve a complete separation of the fluids so that each of the obtained streams contains only a single fluid.

In the centrifugal separators of the above-indicated type, it is possible to isolate from the final stream, by suitably selecting the diameter of the annular partition, a stream composed of a determined fraction of one single fluid. But the remaining portion of the final stream is constituted of a mixture of fluids which might be treated in a second, serially connected, centrifugal separator. Thus, better separating performances are obtained but, on the other hand, the separation of the fluids is not complete. It is possible, of course, to increase the number of separators, but there is a physical limit forming an obstacle thereto which results from the size to be given to the annular separating partition and moreover, one of the obtained fluids is not completely pure.

In certain separators, the intermediate portion of the stream, located between the central stream and the peripheral stream, is reintroduced at the inlet of the separator. Such separators are described in the article of M. BOHNET entitled "Trennen nicht mischbarer Flüssigkeiten" published in "Chemie Ingenieur Technik", vol. 48 No. 3 pages 177–264, and in French Pat. No. 2,130,579.

SUMMARY OF THE INVENTION

It is in order to improve the quality of the fluids separation that the present invention provides a device operating on the principle of the centrifugal separation of immiscible fluids of different specific gravities, said device not being subject to the aboveindicated disadvantages and making possible a substantially complete separation of the fluids forming the mixture.

Finally, according to an alternative embodiment of the present invention, the device is adapted for treating fluid mixtures whose proportions of different components vary to a large extent.

The device according to the invention comprises a tubular body, provided with at least one internal coaxial partition, wherein the mixture is introduced at a first of its ends and discharged, at least partly, at its second end. First means is provided adapted to impart to said mixture, when circulating through said body, a motion having a rotational component about the axis of the tubular body and means for feeding back the stream flowing out from said second end. The device further comprises at least second means adapted to impart to the fluid passing therethrough a rotational component about the axis of the tubular body, said second means being placed from the end of one of the partitions located inside said tubular body.

According to an alternative embodiment of the device of the invention, at least one of the concentric partitions extends partly outside the main section of the tubular body, thereby forming a tubular extension thereof whose end forms the second end of said body, and said second means are placed inside said partition in said tubular extension.

According to a first embodiment of the device of the invention, the tubular body comprises first mixture extraction means communicating with the annular space formed between the external wall of the tubular body and the adjacent coaxial partition, and second extraction means communicating with the space defined by a central coaxial partition of the tubular body. It is the partition adjacent to the external wall of the tubular body which forms a tubular extension of the latter. Downstream from the second means for driving the fluid in rotation is provided third extraction means communicating with the annular space comprised between the tubular extension and a coaxial adjacent internal partition, and fourth extraction means communicating with the space defined by a coaxial central partition.

The annular space comprised between said central partition and said partition adjacent to the tubular extension communicates with said feedback means.

According to a second embodiment of the device of the invention, the tubular body comprises first extraction means communicating with the annular space comprised between the external wall of the tubular body and the adjacent coaxial partition. It is the latter partition which forms the tubular extension of the tubular body. Downstream from said second means for driving the fluid in rotation is provided second extraction means communicating with the space defined by the coaxial central partition. The annular space comprised between said central partition and said tubular extension communicates with said feedback means.

A third embodiment of the device of the invention comprises, between the partition placed downstream said first means for driving in rotation the fluid mixture and said second means for driving in rotation the fluid mixture, at least one assembly of intermediary means imparting to the fluid mixture a motion having a rotational component about the axis of the device and an annular partition defining a space wherethrough circulates a fraction of one of the components having traversed said auxiliary rotary driving means, this space communicating with a fluid extraction duct.

According to an embodiment particularly useful when the proportions of the different fluids to be separated vary to a large extent, the device of the invention comprises for each of the fluids of the mixture, a discharge line communicating with the corresponding extraction means formed by a duct. At least one of the extraction ducts is equipped with a two-way valve and with a sensor supplying a signal characteristic of the nature of the stream circulating through the extraction duct, said sensor being associated with means for placing the valve in a position of communication between the extraction duct and the corresponding discharge line when the flow circulating through the extraction duct consists exclusively of one of the mixture components, as well as means placing the valve in a second position interrupting the communication between the extraction ducts and the corresponding discharge line when the stream flowing through the extraction duct does not consist exclusively of a single one of the mixture components.

In its second position, the valve optionally establishes communication between the extraction duct and said feedback means.

The feedback of the fluid mixture must be effected upstream of the means for driving the fluid in rotation, for example at the inlet of the first end of the tubular body.

BRIEF DESCRIPTION OF THE DRAWINGS

The invention will be better understood and all its advantages will be made clearly apparent from the following description of examples of embodiments of the device according to the invention, as described hereinafter and illustrated by the accompanying drawings wherein:

FIG. 1 shows a first embodiment of the device according to the invention,

FIG. 2 shows a second embodiment of the device,

FIG. 3 relates to modifications which may be brought to the device when the proportions of the fluids vary to a large extent, FIG. 4 illustrates the use of the device in the case of the separation of three immiscible fluids of different specific gravities forming the mixture.

DETAILED DISCUSSION OF THE INVENTION

Figure 5:
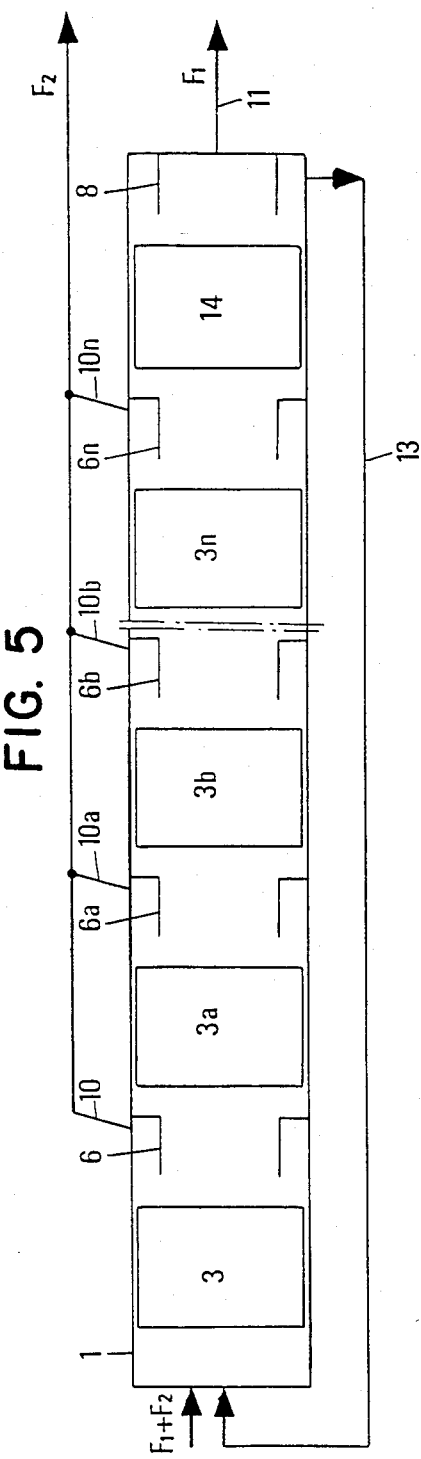
FIG. 5 illustrates a third embodiment of the device.

FIG. 1 diagrammatically shows a first embodiment of the device according to the invention.

The latter comprises a tubular body 1 into which is introduced, at one of its ends 2, a mixture formed of two fluids $F_1$ and $F_2$ of different specific gravities $d_1$ and $d_2$, such that $d_1 < d_2$.

By immiscible fluids it is also meant a mixture formed of a fluid containing suspended solid particles or a diphasic fluid comprising a liquid phase and a gaseous phase.

Inside body 1 are placed first means 3 adapted to impart to the mixture of fluids $F_1$ and $F_2$, a motion having a rotational component about the axis of tube 1.

These means for driving in rotation the mixture are, for example, formed by a rotor carrying blades, having preferably a suitable profile, such for example as that described in the U.S. Pat. No. 3,517,821.

Downstream from these first means 3 for driving in rotation the fluid, are placed a first annular partition 6, coaxial to the tubular body 1, defining therewith a first annular space 7, and a second annular partition 8, coaxial to the tubular body 1 having a diameter smaller than that of the first partition 6.

The central space 9 of the tubular body defined by the second partition 8 communicates with second extraction means 11.

The first partition 6 extends partly outside the main section of the tubular body so that it forms a tubular extension of the latter whose end constitutes the second end of the tubular body.

Second means 14 for driving in rotation the fluid are placed inside the first partition 6 downstream the end of the second partition 8. Downstream from said second means 14 for driving the fluid in rotation are placed a third and a fourth annular partitions having the respective references 16 and 18 in FIG. 1. These partitions are coaxial and internal to the first partition 1. The third partition 16 defines with the extension of the first partition 6 a third annular space 17 which communicates with extraction means 20. The fourth partition 18 of a smaller diameter than that of the third partition 16, defines a central space of the tubular extension. This space is connected to fourth fluid extraction means 21.

The space 22 defined between the third and the fourth partitions, respectively referenced 16 and 18, communicates with fluid feedback means 13. In the case of FIG. 1, the feedback is effected upstream the first means 3 for driving the fluid in rotation. Alternatively, it could have been effected upstream the second means 14 for driving the fluid in rotation.

In the case of FIG. 1, the second means 14 for driving the fluid in rotation are driven by the motor 4.

The operation of the device is indicated below.

The mixture of fluids $F_1$ and $F_2$ is introduced into body 1 at its end 2. The rotatory driving means 3, driven by the motor 4, imparts to the mixture a motion having a rotational component about the axis of body 1. Under the action of the centrifugal force, the fluid $F_1$, of specific gravity $d_1$ is collected in the central portion of the stream while the fluid $F_2$ concentrates at the periphery.

The diameter of the first partition 6 is determined so that in the space 7 circulates a fraction of fluid $F_2$ which is discharged through line 10.

The diameter of the second partition 7 is selected so that in space 9 circulates only a fraction of fluid $F_1$ which is discharged through line 11.

The remaining mixture of fluids $F_1$ and $F_2$ which circulates through the residual annular space 12, is subjected to a second centrifugation by the second means 14 for driving the fluid in rotation. Under the action of the centrifugal force the fluid $F_1$ is gathered in the central portion 19 of the stream and the fluid $F_2$ at the peripheral portion 17. The stream circulating through space 22 is fed back upstream said first means 3 for driving the fluid in rotation.

The diameter of the partitions 16 and 18 is so determined that through the spaces 17 and 19 circulates substantially a single type of fluid, respectively $F_2$ and $F_1$.

The diameters of the partitions 6, 8, 16 and 18 are determined as above-indicated in relation with the proportion of fluids $F_1$ and $F_2$ introduced into the device.

Preferably, but not exclusively, the diameters of the partitions 6, 8, 16 and 18 are so selected as to provide for the extraction of the same relative amounts of fluids $F_1$ and $F_2$. Thus, the mixture fed back through line 13 contains substantially the same proportions of fluids $F_1$ and $F_2$ as the fluid mixture to be treated.

The advantage of this embodiment, in addition to the quality of the separation of the mixture components achieved therewith, consists of the fact that the second rotatory driving means 14 and the separating partitions associated therewith may be of small size, since they treat a limited flow of mixture of fluids $F_1$ and $F_2$. Moreover, the flow of fluid mixtures fed back at the inlet of the device is small.

FIG. 2 shows another embodiment of the device which can be used even to separate fluids whose specific gravities are not very different. The same references have been used to designate the same elements.

This embodiment makes use of means 3 and 14 for driving the mixture in rotation. The first partition 6 is interposed between these means and defines with the tubular body 1 a space 7 wherethrough circulates a fraction of fluid $F_2$ which is discharged through line 10.

The remaining mixture, formed of the totality of fluid $F_1$ and of the remaining fraction of fluid $F_2$, is subjected to the action of the second rotatory driving means 14. The second partition 8, interposed between the means 14 and the end 5 of the tubular body 1, isolates the central portion of the stream issuing from the second rotatory driving means wherethrough circulates only a fraction of fluid $F_1$ which is discharged through line 11.

The mixture of fluids $F_1$ and $F_2$ circulating through the residual space 12 is fed back to the inlet of the device through line 13.

The preceding description shows that there is obtained, in the extraction lines, single-fluid streams, at least when the proportions of fluids $F_1$ and $F_2$ are liable to be subjected to limited variations at the inlet of the device. The diameters of the separating partitions are determined in accordance with these variations so that at any time, the partitions isolate stream portions containing only one single fluid.

In the case where the proportions of fluids $F_1$ and $F_2$ vary to a large extent at the inlet of the device, for example, when the content of fluid $F_1$ or $F_2$ varies between 0 and 100%, it is advisable to modify the device of the invention, according to the embodiments illustrated in FIG. 3.

A sensor 22 is placed on the fluid $F_2$ extraction line 10 to indicate whether the fluid circulating through said line is exclusively composed of fluid $F_2$ or whether it is composed of a mixture of fluids $F_2$ and $F_1$. This sensor may be of any known type. For example, the sensor determines the presence of one and/or the other of the two fluids by measuring the electric resistance of the stream flowing through line 10. This sensor controls a two-way valve 24 through a circuit diagrammatically shown at 23.

When the sensor 22 delivers a signal indicating the presence of fluid $F_2$ alone, the valve 24 is placed in its first position which connects line 10 to a line 25 for discharging fluid $F_2$.

When the signal from sensor 22 indicates the presence of fluid $F_1$ in line 10, the control circuit 23 actuates the valve 24 which is placed in its second position where it stops the communication between the extraction line 10 and the fluid $F_2$ discharge line 25.

In its second position, the valve may simultaneously put line 10 in communication with a line 26 opening upstream of at least one means for driving the fluid in rotation. In the case of FIG. 3, line 26 opens at the inlet of the device.

Similarly, a sensor 27 is placed at the outlet of the device on the line 11 for extracting fluid $F_1$ and controls a two-way valve 29, through a circuit 28.

When the signal delivered by sensor 27 indicates that the stream through line 11 is exclusively composed of fluid $F_1$, the valve 29 is placed into a position at which line 11 is exclusively connected with line 30 for discharging fluid $F_1$.

When the signal delivered by sensor 27 indicates the presence of fluid $F_2$ in line 11, the valve 29 is placed into its second position at which the line 11 is connected with a line 31 which opens upstream of at least one member for driving in rotation the fluid. In the case of FIG. 3, line 31 opens at the inlet of the device.

Of course, the distance between each sensor and the valve controlled therewith is selected sufficient to make effective the operation of the valve before it is traversed by the fluid mixture, whereas, in the case of detection of a single fluid, a temporization delays the operation of the valve.

The operation of the device is obvious from the preceding description.

Under normal operating conditions, only fluid $F_2$ flows through line 10. The valve 24 puts in communication lines 10 and 25. Similarly, only fluid $F_1$ flows through line 11 when it is put in communication with line 30.

When, at the inlet of the device, the proportion of fluid $F_2$ decreases below the proportion of the fluid extracted through line 10, some fluid $F_1$ flows through line 10. The sensor 22 detects the presence of said fluid $F_1$ and the valve 24 puts in communication the lines 10 and 26. The totality of fluid $F_2$ is accordingly fed back to the device, thereby increasing the proportion of fluid $F_2$ at the inlet of the device. During this time, the fluid flowing through line 11 consists exclusively of fluid $F_1$ which flows into line 30 through the valve 29.

When the proportion of fluid $F_2$ at the inlet of the device reaches a value at which only fluid $F_2$ flows through line 10, the sensor 22 actuates the valve 24 to put again in communication the lines 10 and 25.

Conversely, when the proportions of fluid $F_1$ at the inlet of the device decreases below a value at which the sensor 27 indicates the presence of fluid $F_2$ in line 11, the valve 29 puts in communication the lines 11 and 31, thereby providing for the feed back of the totality of fluid $F_1$ to the inlet of the device, thus increasing the proportion of fluid $F_1$ at the inlet of said device. During this time, the fluid flowing through line 10, composed exclusively of fluid $F_2$, flows into line 25 through the valve 24.

When the proportion of fluid $F_1$ at the inlet of the device reaches a value at which only this fluid flows through line 11, the sensor 27 actuates the valve 29 to restore the communication between lines 11 and 30.

The above description is based on the case of separation of two immiscible fluids of different specific gravities. The device may also be used to separate more than two fluids, as diagrammatically shown in FIG. 4, wherein it has been assumed that the initial mixture contained three fluids $F_1$, $F_2$, $F_3$ of respective specific gravities $d_1$, $d_2$, $d_3$ such that:

$$d_1 < d_2 < d_3$$

Two serially interconnected devices A and B are used, the first device A delivering a portion of fluid $F_3$ and, on the other hand, a mixture of fluid $F_1$ and $F_2$ which are then separated by the second device B.

FIG. 5 shows another embodiment. According to the latter, the fluid entering the device is subjected to the action of first rotatory driving means diagrammatically shown at 3 and an annular partition 6 separates the fraction of fluid $F_2$ which is discharged through line 10.

The mixture of fluid $F_1$ and of the remaining fraction of fluid $F_2$ is then subjected to the action of new rotatory driving means $3a$ associated with an annular partition $6a$ which separates a new fraction of fluid $F_2$, discharged through line 10a. Other rotatory driving means 3b . . . 3n, serially connected and respectively associated with the annular partitions 6b . . . 6n, permit extraction of the major portion of fluid $F_2$.

The remaining mixture is then subjected to the action of rotatory driving means 14 associated with an annular partition 8 which isolates a fraction of fluid $F_1$ discharged through line 11.

The remaining mixture is recycled through line 13.

Modifications may be brought to the various embodiments of the invention illustrated by the different figures.

Thus, it is possible to provide means for regulating the rotation speed of the means for driving the mixture in rotation.

In the embodiments making use of several rotatory driving means, these means may be driven by different motors, at different speeds, either by acting on these motors or by interposition of mechanical reducers.

The modifications illustrated in FIG. 3 may be brought to each of the other embodiments of the device according to the invention.

The device has numerous and various utilizations. It can be used for degasing a liquid, treating a liquid containing solid particles in suspension, etc.

In addition, it offers advantages in the treatment of waters polluted by the spillage of such a product as hydrocarbons. As a matter of fact, such a separation system makes it possible for example, to discharge a water substantially free of hydrocarbon traces.

Figure 6:
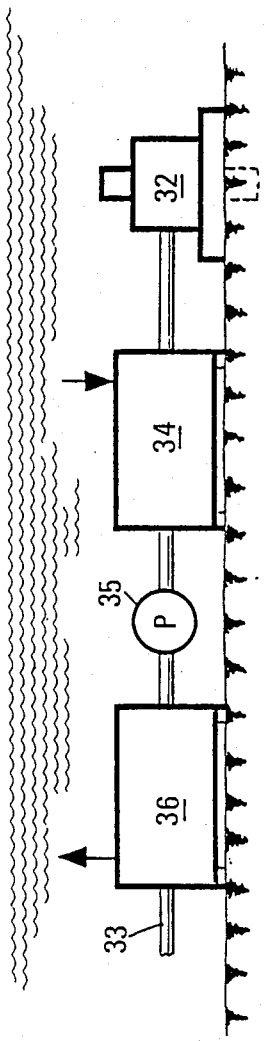
FIG. 6 shows one case of use of the device.

FIG. 6 shows another possible use of the device according to the invention.

As a matter of fact, let us consider a submerged oil well 32 producing a diphasic fluid, comprising liquid hydrocarbons and gaseous hydrocarbons in such proportions that the pressure of this diphasic fluid cannot be increased to the required value for its conveyance through line 33 by means of the presently available pumping equipment.

It is known that said diphasic fluid may be admixed with a sufficient amount of water to obtain a new diphasic fluid whose pressure may be increased by the presently available pumping equipment. Preferably, this water is sea water, previously treated if necessary (by filtration etc.) and introduced into the diphasic fluid by means of a suitable mixer, diagrammatically shown in 34. Such a mixer is described, for example, in the French patent application No. 2,417,057. After increase of the pressure by a pumping assembly 35, the water contained in the mixture is withdrawn by means of the device 36 according to the invention in order to be totally or partially discharged to the sea or optionally reintroduced into the hydrocarbon diphasic mixture by the mixer 34.

Thus, only the liquid and gaseous hydrocarbons are introduced into the transportation line 33 and no polluting discharge of hydrocarbons in water is effected.

What is claimed is:

1. A method of use of a device for separating components of a mixture of at least two immiscible fluids of different specific gravities, the device having inlet means connected to a tubular body having at least one coaxial partition internally for withdrawing the mixture at a first end of the tubular body and respective extraction means connected to the tubular body toward the second end thereof for discharging the mixture, one of the at least two immiscible fluids and another of the at least two immiscible fluids, first means for imparting to the mixture, when flowing through the body, a motion having a rotational component about the axis of the tubular body, at least second means adapted for imparting to the fluid passing therethrough a rotational component about the axis of the tubular body and located downstream from the end of one of the partitions inside the tubular body, and feedback means for feeding back the stream, issuing from the second end, to the inlet means, the method comprising: withdrawing a diphasic fluid comprising liquid hydrocarbons and gaseous hydrocarbons from a submerged oil well; adding and mixing sufficient water to said diphasic fluid to form a second diphasic fluid capable of being pressurized by a pump; pressurizing the second diphasic fluid with a pump; separating the added water from the pressurized second diphasic fluid by passing it though said device for separating a mixture of immiscible fluids; and conveying the thus-pressurized diphasic fluid of liquid and gaseous hydrocarbons through a pipeline.

2. A method as in claim 1 further comprising sensing the composition of the fluid being discharged through at least one of the respective extraction means and if the composition sensed consists essentially of only one of the fluids of the mixture, discharging the one fluid sensed, and if the composition does not consist essentially of only one of the fluids, recycling it again to the inlet of the device for separating components to be further separated.

3. A method as in claim 2, wherein said sensing is conducted by measuring the electrical resistance of the fluidsbeing discharged through at least one of the respective extraction means.

4. A method as in claim 1, wherein the diphasic fluid further comprises solid particles in suspension and the device further comprises a respective extraction means for said solids, said method comprising passing said diphasic fluid having solids in suspension through said device to thereby separate said solids, and separate said fluids making up said diphasic fluids one from the other.

5. A method as in claim 1, wherein said water introduced into said diphasic fluid is sea water introduced through a mixer.

6. A method as in claim 1 further comprising recycling the separated water and mixing it with additional diphasic fluid hydrocarbons being withdrawn from the submerged well to conduct the process continuously.

* * * * *